United States Patent [19]

Grimes, Sr.

[11] 4,453,343
[45] Jun. 12, 1984

[54] IRRIGATION SYSTEMS

[76] Inventor: Roland S. Grimes, Sr., P.O. Box 1131, 29 Palms, Calif. 92277

[21] Appl. No.: 483,191

[22] Filed: Apr. 8, 1983

[51] Int. Cl.³ .......................................... A01G 29/00
[52] U.S. Cl. ................................................. 47/48.5
[58] Field of Search ..................... 47/48.5, 79, 80, 81, 47/47; 111/7.1, 7.2, 7.3, 7.4, 6

[56] References Cited

U.S. PATENT DOCUMENTS

| | | | |
|---|---|---|---|
| 656,887 | 8/1900 | Golibart | 47/48.5 |
| 3,900,962 | 8/1975 | Chan | 47/48.5 |
| 4,051,628 | 10/1977 | Knapp et al. | 47/48.5 |
| 4,089,133 | 5/1978 | Duncan | 47/48.5 |

Primary Examiner—Robert A. Hafer
Assistant Examiner—Bradley M. Lewis
Attorney, Agent, or Firm—Bernhard Kreten; Leonard Bloom

[57] ABSTRACT

A receptacle for holding water and other nutrients a portion of which is adapted to be placed below grade for irrigating plants, and includes apertures in the bottom of the receptacle to allow the slow migration of liquids outwardly therefrom and a lid on a top face suitably formed to prevent evaporation, the apertures provided with a semispherical cap to prevent fouling.

19 Claims, 3 Drawing Figures

U.S. Patent  Jun. 12, 1984  4,453,343
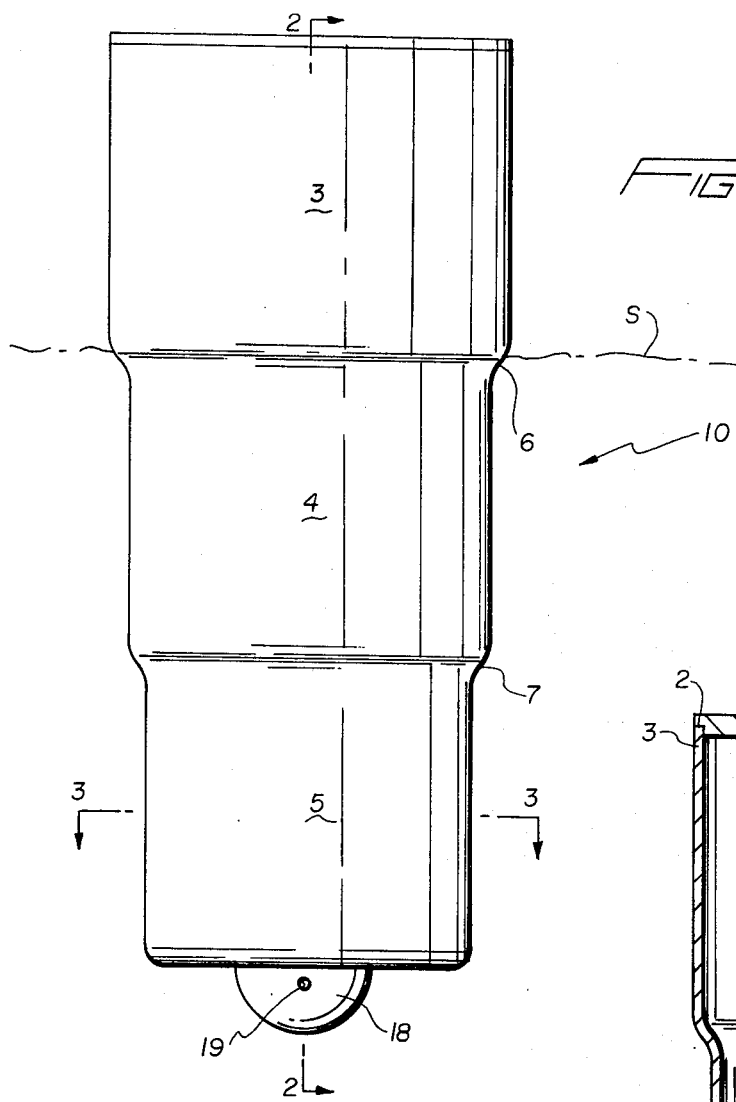
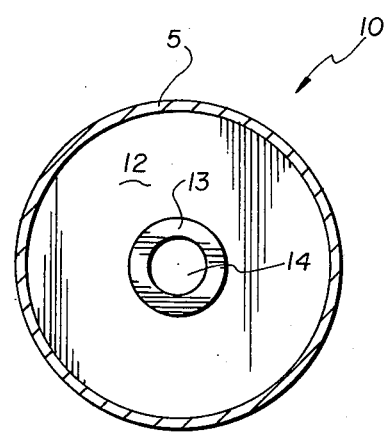
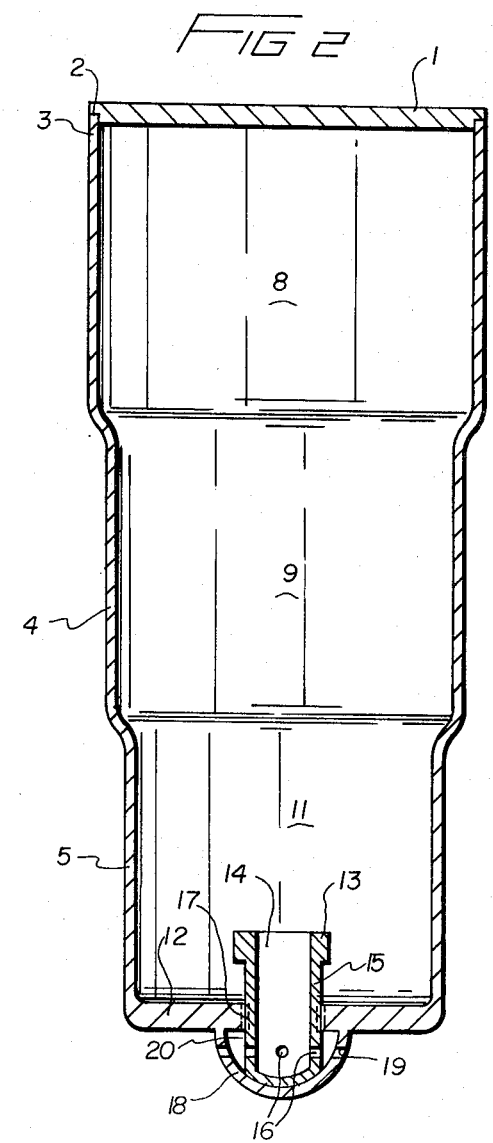

IRRIGATION SYSTEMS

BACKGROUND OF THE INVENTION

The following invention relates generally to devices used to irrigate plants, crops, and the like.

The need for plants being watered regularly is well documented. In the past, elaborate irrigation systems including conduits that extend considerable distances have been provided which mist water into the air, a portion of which will run down to the ground immediately adjacent the plant for communication with plant's roots. Other forms of irrigation include the provision of drip type irrigators placed immediately adjacent the plant's base for allowing a slow steady migration of fluids from the drip hose to the surface of the land within which the plant is embedded.

It should be clear that whatever known prior art techniques exist for providing plants with water, when the water is placed above or on the ground, a considerable amount of water is lost to evaporation, runoff, and the like requiring a greater amount of water then would normally be required. In addition, the inadvertent spraying of a plant with water when in direct sunlight can cause burning of the plant, an undesired phenomena which requires that the watering process to be done in the evening or early morning hours. It is known that some soils, while being suitable for growing crops, do not readily hold the water and therefore the moisture associated with irrigation may run-off and away from the plants roots prior to doing the required job of feeding the plants and can also cause erosion. In addition, the irrigation systems listed hereinabove are wasteful not only of the water, but also of nutrients that may want to be included for feeding the plants in a particular manner.

The following patents reflect the state-of-the-art of which applicant is aware, insofar as these citations appear germane to the process at hand.

U.S. Pat. No. 2,791,347— Boehm
U.S. Pat. No. 3,345,774— Delbuguet
U.S Pat. No. 3,755,966— Smith
U.S. Pat. No. 4,336,666— Caso The patent to Delbuguet teaches the use of a plant water feeding device in which a stake like member is allowed to penetrate the ground, the stake having an internal reservoir capable of being filled, and at the lowermost portion of the stake a plurality of apertures are provided being suitably dimensioned to allow the controlled metering of liquid therefrom.

The patent to Smith teaches the use of a device in which a deep root feeder for trees has been provided which includes an elongate cylindrical canister having a plurality of apertures at opposed ends and filled with gravel and fertilizer pellets which container is adapted to be placed near the tree. Water, air and nutriants are carried through the gravel and fertilizer pellets to assure the roots well below the surface are adequately fed.

The patent to Boehm teaches the use of an underground recepticle in which a removable lid provides access to a container disposed below the grade, the container having a plurality of apertures at its lowermost extremity and a screen for communication and ventilation of a recepticle interior with the ground in which the recepticle is embedded. More particularly, this device is intended for the placement of milk bottles or the like therein and allows for run off of spilt milk.

The remaining citations shows the state-of-the-art further.

By way of contrast, the instant invention is distinguished over the known prior art by the provision of a plant watering device which has a portion adapted to be suitably disposed above the soil level, and a section which is adapted to reside within the ground itself. The reservoir associated with the instant application is embedded at a suitable depth so that the bottommost portion of the reservoir can communicate with the roots immediately adjacent the bottom of the reservoir. To this end, the reservoir bottom includes a plug member capable of axial translation within the bottom wall of the reservoir which can selectively occlude certain apertures disposed on a stem of the plug member. A semi-spherical cap is provided by a bottom outer wall of the reservoir in overlying relation to the threaded plug, the semi-spherical cap provided with a plurality of apertures allowed to communicate with corresponding apertures on the plug member so that a slow and constant migration of liquid can occur from inside the reservoir to without. The reservoir includes an openable lid disposed at a convenient height above the grade of the soil so that refilling the container at regular intervals can occur, whereby a modest amount of liquid can be utilized to feed the associated plant while avoiding the problems associated with evaporation and runoff.

SUMMARY AND OBJECTS OF THE INVENTION

Accordingly, this invention has as an objective the provision of an improved device for irrigating plants or the like which holds to an absolute minimum, loss of liquid due to evaporation and runoff.

A further object of this invention contemplates providing a device as characterized above which is relatively inexpensive to manufacture, extremely safe to use, and lends itself to mass production techniques.

It is still a further object of this invention to provide a device as characterized above which controls the liquid flow rate so that migration of the liquid from the container to the areas adjacent thereto which serve as host soil for plants or the like provide a controlled dispensation of the liquid. Thus, plants having roots at a level below the soil immediately adjacent the outlets associated with the instant invention can be properly fed.

These and other objects will be made manifest when considering the following detailed specification when taken in conjunction with the appended drawing figures. Particularly, the instant application is directed to and provides an instrumentality for placement adjacent the situ of a plant that is growing, the instrumentality adapted to be placed in such a manner that a portion of the instrumentality is above grade and a further portion is below grade. Means are provided along a bottom wall of an associated reservoir instrumentality to allow the controlled metering of liquids from a bottom of a reservoir outwardly adjacent the plant root system. Means are further provided to enclose the liquid contained within the reservoir so that loss of liquid due to evaporation or consumption by animals has been avoided.

DESCRIPTION OF THE DRAWING FIGURES

FIG. 1 is a side view of the apparatus according to the present invention.

FIG. 2 is a sectional view taken along lines 2—2 of FIG. 1.

FIG. 3 is a sectional view taken along lines 3—3 of FIG. 1.

BRIEF DESCRIPTION OF THE PREFERRED EMBODIMENT

Referring to the drawings now, wherein like reference numerals refer to like parts throughout the various drawing figures, reference numeral 10 is directed to the reservoir system according to the instant application known as the Artesian TM system.

As shown in FIG. 1, the reservoir 10 is formed from a plurality of tiered enclosures, wherein plural adjacent horizontally offset tiers have a change in diameter which diameter increases from the lowermost enclosure to the uppermost. Preferrably, the receptacle includes three such tiers, each of the tiers adapted to communicate with immediately adjacent ones by means of necked down portions. As shown, the uppermost tier 3 is provided with a lid 1 that includes an L shaped step portion 2 so that an inner diameter of the lowermost face of the lid 1 can nest within the outer peripheral wall 3 of the uppermost tier. The uppermost tier 3 has an interior 8 adapted to be in fluid communication with the next most lower interior 9, which is similarly defined by a tier having a peripheral wall 4. A necked down area 6 defines the transition between these upper and middle tiers, and as shown the tiers are substantially cylindrical in shape but conically taper from one tier to the next. The tapering facilitates placement of the reservoir in a hole which tapers naturally after being dug.

Similarly, the middle tier 4 having an interior 9 communicates with a lowermost interior 11 defined by the annular wall of cylindrical section 5, the lowermost tier 5 communicating with middle tier 4 by means of a similar necked down portion 7 thereby reducing the diameter of the lowermost tier relative to the middle tier. The lowermost tier 5 includes a substantially horizontally disposed bottom wall 12 in parallel with the top 1, and a central bore 17 is provided with suitable threads to communicate with a plug 13 having a threaded stem 15 and a hollow central area 14. The plug 13 has a knurled top exterior which allows easy rotation of the plug relative to the bottom wall 12 so that plug 13 can be advanced axially within the threaded bore 17. A lowermost portion of the threaded stem 15 is provided with a plurality of apertures 16 so that liquid above the top of the plug 13 is allowed to communicate with the hollow 14 and then outwardly through the apertures 16.

The outer face of the bottom wall 12 is provided with a semi-spherical dome 18 also including a plurality of apertures 19. The dome serves to resist clogging of the aperture 16 in the plug, and the spherical configuration similarly retards fouling of the holes 19 in the semispherical bottom cap 18. As shown the plug 13 has a bottom surface complimental to the curvature of dome 18.

In a preferred form of the invention, it is desired that the Artesian receptacle 10 be placed adjacent plants, or seedlings. Upon removal of the top lid 1, the interior 8, 9 and 11 of the Artesian reservoir can be filled with water and fertilizer if desired. The extent within which the aperture 16 extends into the open area 20 which is encapsulated by the hemisphere 18 determines the flow rate of the liquid outwardly therefrom. It is well known that plants benefit from slow constant feedings where the root stock is constantly gaining nurture rather than an abrupt massive infusion of nutrient and liquid followed thereafter by prolonged periods of abstinence.

Thus, with the apparatus according to the present invention, when the apertures at the bottom of the reservoir have been accurately oriented plants can experience a long protracted feeding which encourages the root stock to grow with great vigor.

By having one tier of the reservoir system above ground, it is a relatively minor chore to check the feed rate of the system relative to its local environment and top up the liquid as is necessary. By having the topmost tier placed above the ground, the presence of the lid precludes the possibility that dirt and other debris will enter into the reservoir. Similarly, the configuration of the hemispherical cap on the bottom face of the reservoir renders it unlikely that the openings at the bottom of the reservoir will become fouled with dirt or the like.

It is contemplated that plastic is a preferred material for fabrication of the article, but it should be equally clear that metal, ceramic or other equivalent structures could be similarly utilized and the choice of materials is not seen to be a limitation. Moreover, it is contemplated that numerous structural modifications are contemplated as being a part of this invention as set forth hereinabove and as defined hereinbelow by the claims.

I claim:

1. An irrigation system comprising in combination:
   a receptacle means having a removable lid therefore, and
   metering means on a lowermost portion of said receptacle allowing fluid contained within said receptacle to be metered outwardly therefrom,
   said metering means being adjustable and including a plug member threadedly disposed in a bottom face of said receptacle including a central plug bore and a plurality of apertures at a lowermost stem of said plug member, whereby threads complementally formed on said bottom face of said receptacle can both orient said apertures associated with said plug member for controlling flow rate and axially translate said plug member.

2. The device of claim 1 including antifouling means on a bottom face of said receptacle whereby disposition of said receptacle in the ground will not be fouled by penetration of dirt.

3. The device of claim 2 wherein said receptacle includes a portion disposed above ground.

4. The device of claim 3 wherein said antifouling means is formed from a semispherical dome shaped cap on said bottom face of said receptacle including a plurality of apertures.

5. The device of claim 4 wherein said lid is provided with means to nest on said receptacle.

6. The device of claim 5 wherein said receptacle is formed from a plurality of tiers, each successive lower tier having a reduced diameter then an immediately higher one, and a necked down transition area between adjacent said tiers.

7. The device of claim 6 wherein said tiers are formed as cylindrical sections.

8. The device of claim 7 wherein said receptacle is formed from plastic.

9. In an irrigation system, the combination including a receptacle adapted to receive liquid therein, metering means adjustably disposed on a bottom face of said receptacle and including a plug member threadedly disposed in a bottom face of said receptacle including a central plug bore and a plurality of apertures at a lowermost stem of said plug member, whereby threads complementally formed on said bottom face of said receptacle can both orient said apertures associated with said plug member for controlling flow rate and axially translate said plug member, and lid means associated with a topmost extremity of said receptacle whereby flow rate out of said receptacle can be controlled and evaporative losses are minimized.

10. The device of claim 9 including antifouling means on a bottom of said receptacle whereby disposition of a portion of said receptacle below grade does not alter the flow rate by contamination with the soil.

11. The device of claim 10 wherein a portion of said receptacle is above ground.

12. The device of claim 11 wherein said receptacle is formed from a plurality of vertically disposed cylindrical sections interconnected by means of tapering necked down portions, said necked down portions providing a smooth transition between adjacent cylindrical sections.

13. The device of claim 12 wherein each said receptacle sections are of substantially constant cross-section.

14. The device of claim 13 wherein said lid is provided with a step portion whereby said lid can be nested on top of said receptacle.

15. An irrigation receptacle or the like comprising in combination a plurality of horizontally stacked tiers of varied dimension, adjacent said tiers adapted to communicate one with the other, necked down portions defining areas of transition between successive tiers, a bottom wall of said receptacle adapted to hold liquids within said recepticle, a threaded plug having a central bore threaded onto said bottom wall and adapted to be vertically translatable, a plurality of apertures disposed at a lowermost portion of said plug, and a semispherical dome occluding a bottommost portion of said plug limiting said plug's travel, said semispherical dome provided with apertures to allow egress of fluid therefrom, a bottom of said plug having the curvature complemental to the curvature of said semispherical dome.

16. The device of claim 15 including a lid means disposed on said topmost tier, said lid means provided with nesting means adapted to reside within a top lid protion of said uppermost tier.

17. The device of claim 16 wherein said receptacle is formed from plastic.

18. The device of claim 17 including means an said plug to assist in rotation and axial translation thereof.

19. The device of claim 18 wherein said translation means comprising knurlling.

* * * * *